US006422434B1

(12) United States Patent
Lammond Wass et al.

(10) Patent No.: US 6,422,434 B1
(45) Date of Patent: Jul. 23, 2002

(54) DISPENSER PUMPS

(75) Inventors: Anthony Charles Lammond Wass, Stamford; Jeffrey William Spencer; Richard Smith, both of Leicestershie; Brian Robert Law, Leicester, all of (GB)

(73) Assignee: Rieke Packaging Systems Limited, Leicester (GB)

( * ) Notice: Subject to any disclaimer, the term of this patent is extended or adjusted under 35 U.S.C. 154(b) by 0 days.

(21) Appl. No.: 09/787,836

(22) PCT Filed: Sep. 27, 1999

(86) PCT No.: PCT/GB99/03222

§ 371 (c)(1), (2), (4) Date: Jun. 4, 2001

(87) PCT Pub. No.: WO00/18513

PCT Pub. Date: Apr. 6, 2000

(30) Foreign Application Priority Data

Sep. 25, 1998 (GB) ............................................. 9820962

(51) Int. Cl.$^7$ .............................................. B65D 25/40
(52) U.S. Cl. .................... 222/571; 222/375; 222/383.1; 417/569
(58) Field of Search ......................... 222/321.3, 321.7, 222/375, 380, 384, 383.1, 372, 571, 39; 417/440, 468, 469, 559, 569

(56) References Cited

U.S. PATENT DOCUMENTS

| 4,739,904 A | * | 4/1988 | Spencer et al. | ............. 222/109 |
| 5,096,094 A | * | 3/1992 | Guilbert | ..................... 222/153 |
| 5,549,223 A | * | 8/1996 | Hori | ....................... 222/153.13 |
| 5,556,005 A | * | 9/1996 | Banks | .......................... 222/96 |

* cited by examiner

*Primary Examiner*—William C. Doerrler
*Assistant Examiner*—Melvin A. Cartagena
(74) *Attorney, Agent, or Firm*—Fay, Sharpe, Fagan, Minnich & McKee, LLP

(57) ABSTRACT

A fixed-nozzle dispenser pump suitable for large doses has a downwardly-directed nozzle tip (32) and an outlet valve arrangement (4) in a nozzle (3). A blocking element, such as a ball (41), of the outlet valve arrangement (4) is biased back along a close-fitting tubular draw path (43) in the valve after dispensing, so as to draw product back out of the nozzle tip and prevent dripping. A further feature is a subdivision of the nozzle tip and a flexible flap valve (35) blocking a resulting passage segment in the nozzle. This facilitates clearance of another nozzle passage (36) by the reverse suction. A further feature is a membrane (24) across the front of the piston plunger, advanceable relative to a piston seal (231) by pressure of a plunger head (21). This helps accomodate the returned fluid and enables a spot-dosing action.

11 Claims, 7 Drawing Sheets

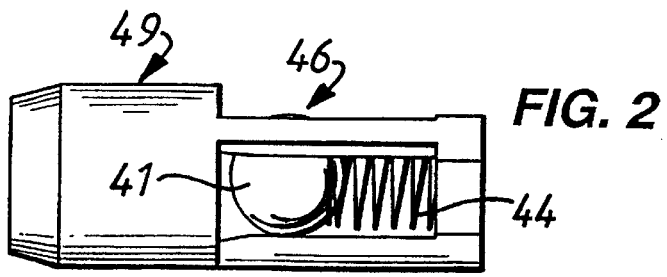
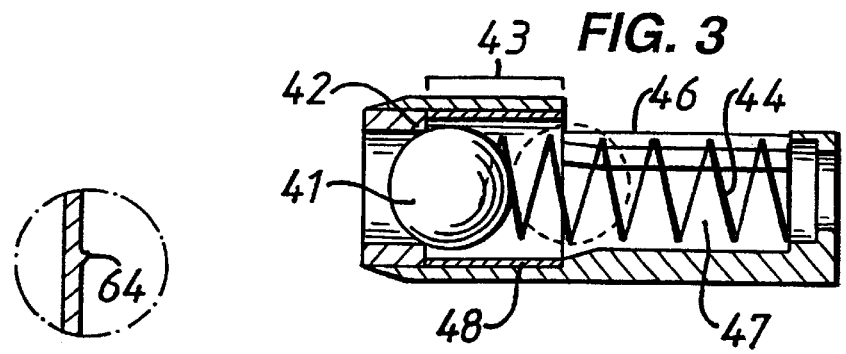
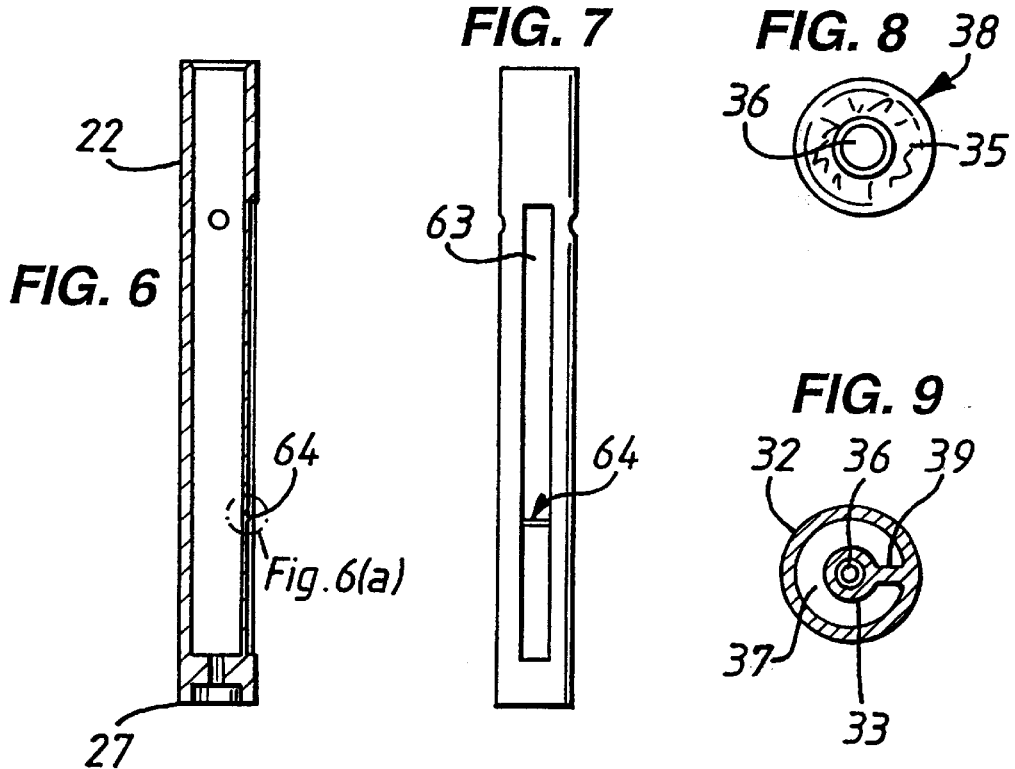

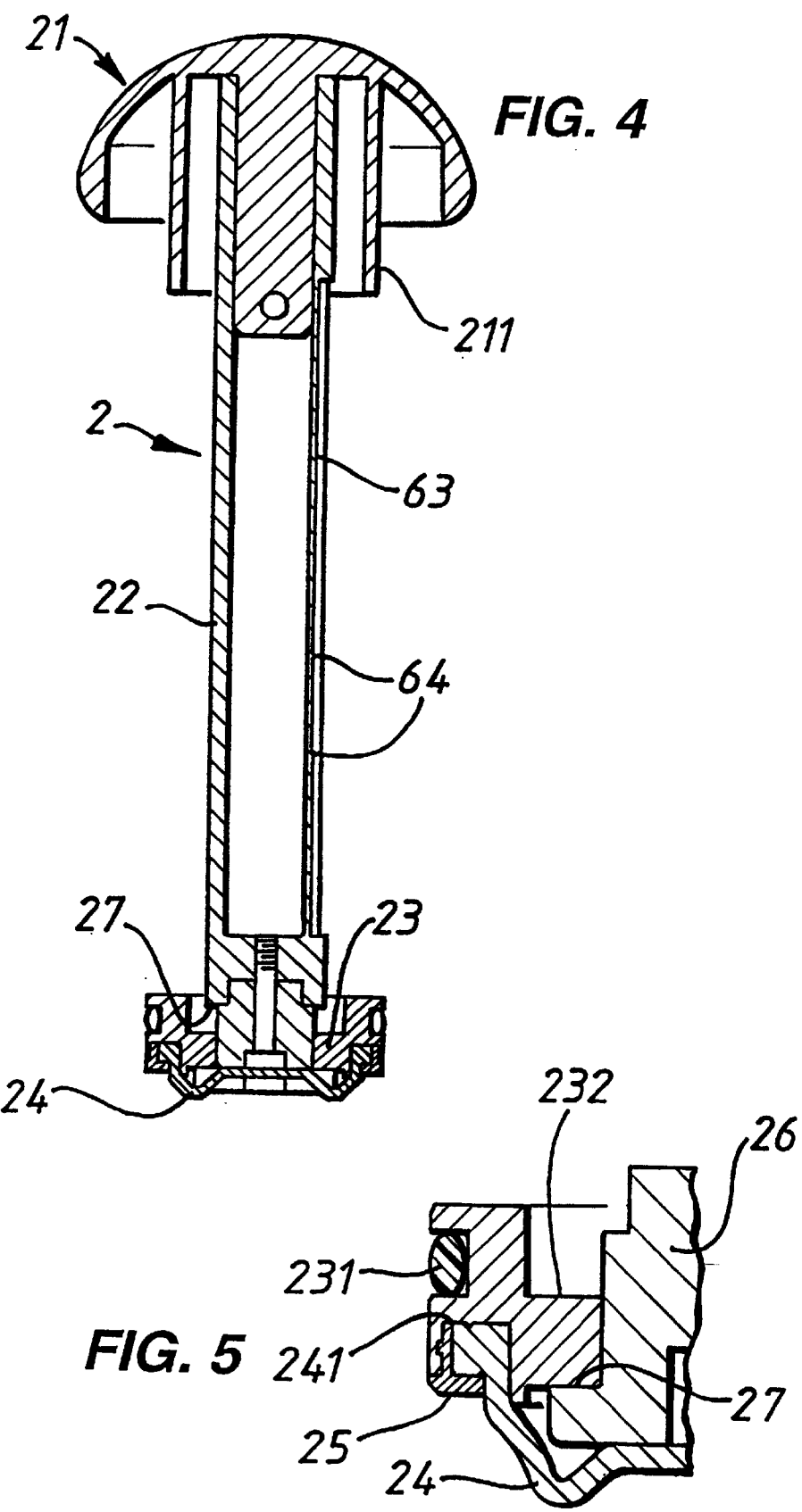

FIG. 11(a)
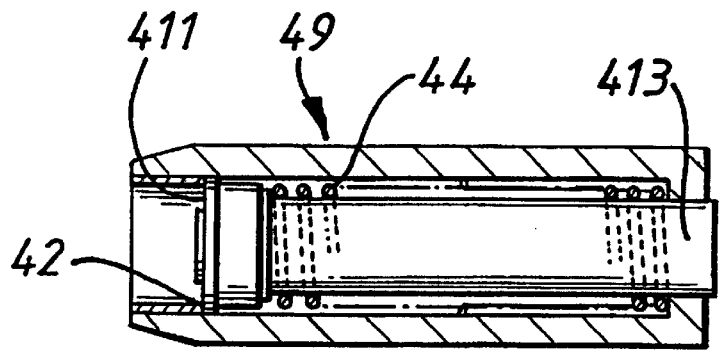
FIG. 11(b)
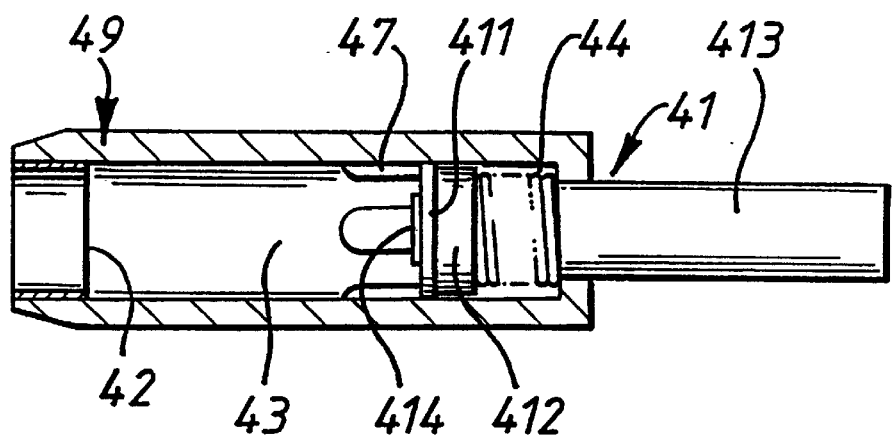
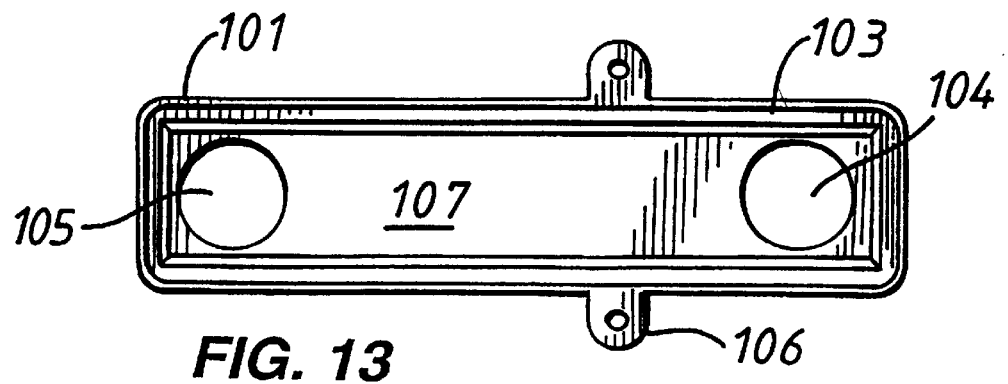
FIG. 13

FIG. 12(a)
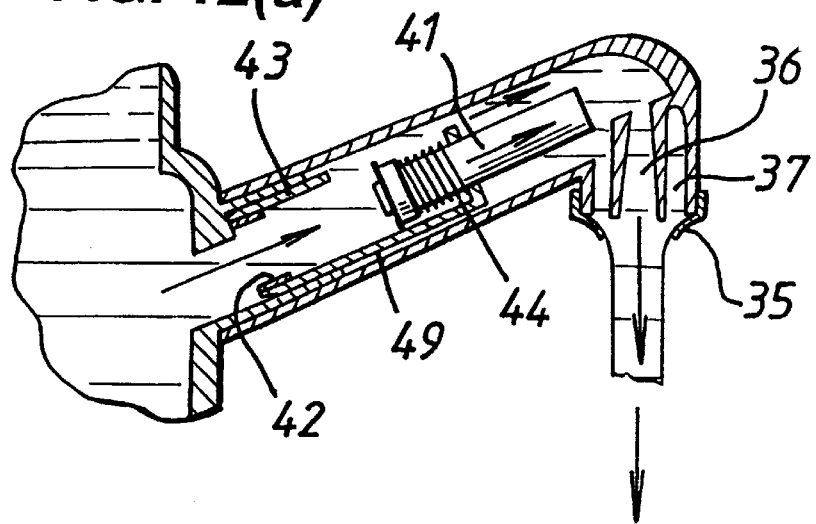
FIG. 12(b)
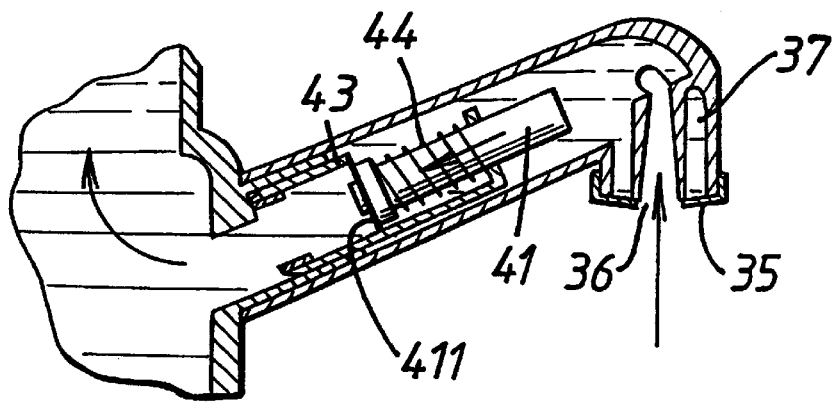
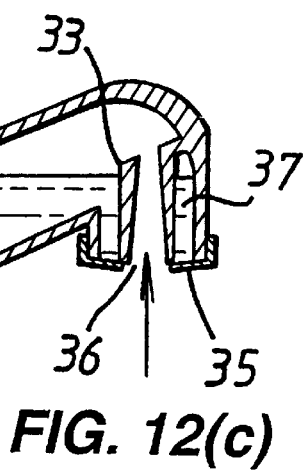
FIG. 12(c)

DISPENSER PUMPS

FIELD OF THE INVENTION

This disclosure relates to dispenser pumps, and particularly but not exclusively to dispenser pumps suitable for mass manufacture predominantly in plastics material.

BACKGROUND

Dispenser pumps of the general kind to which the disclosure relates have a pump chamber alterable in volume by the action of a reciprocable plunger. A pump chamber inlet which receives material from a supply container includes an inlet valve. The outlet through which the dispensed material leaves the pump chamber may have an outlet valve. There may be a projecting discharge spout or nozzle. Some of these options are requirements in certain aspects of this disclosure, as explained below.

Preferably—and in some of the present proposals essentially—volume alteration of the pump chamber is by a piston operating slidably in a cylinder, e.g. a plunger piston operating in a fixed cylinder formed by the pump body, typically with an outward seal on the piston wiping the cylinder wall in use.

The present proposals are preferably embodied in pumps having the outlet (and spout/nozzle, where provided) fixed relative to the pump body but they may also be implemented in movable-nozzle pumps i.e. in which an outlet passage extends through the plunger.

In a first aspect our proposals have to do with the difficulty associated with product which remains in the discharge nozzle of the dispenser after the dispensing stroke. Particular difficulties, depending on the nature of the product, include dripping from the nozzle and nozzle blockage by dried product residues.

These difficulties are known and have been addressed in the prior art by what can generally be called suck-back arrangements whereby product residue is drawn back from the nozzle at the end of the dispensing stroke. See e.g. EP-A-779106 and our own WO-A-95/25600. These earlier proposals delay or compromise the closure of an outlet valve after dispensing so that the negative pressure in the pump chamber during priming can act to suck the residue in the nozzle back through the valve.

SUMMARY OF THE INVENTION

In a first aspect of our new proposals a dispenser pump of the kind described has a discharge passage extending along a discharge nozzle downstream of an outlet valve arrangement, the outlet valve arrangement including a blocking element movable along the discharge passage between a closed valve condition at an upstream position and an open valve condition at a downstream position. The blocking element is biased towards the upstream, closed position e.g by spring means and/or gravity. The valve arrangement defines a draw path in the discharge passage between the mentioned downstream and upstream positions, dimensioned to be substantially blocked by the blocking element. During the dispensing stroke the initial flow of pressurized product from the pump chamber carries the blocking element downstream against the mentioned bias to the open condition at the downstream position where the product can flow out past it. At the end of the dispensing stroke the blocking element is biased back from the open condition and along the draw path which it substantially blocks so that, as it travels back, product residue in the discharge passage region downstream of the outlet valve arrangement is drawn-back away from the nozzle tip.

This arrangement may reduce or prevent dripping at a downwardly-directed nozzle end opening, without relying on generating negative pressure in the pump chamber since material need not pass the valve's blocking element. The arrangement is therefore specially useful for pumps having no means for biasing the plunger back to its extended position after the dispensing stroke, and/or in which the supply is disposed relative to the pump so as to give a prevailing positive pressure in through the inlet valve.

Preferably the nozzle is a fixed nozzle projecting sideways from the pump body. The preferred form has a portion extending upwardly from the outlet valve arrangement—enabling gravity biasing—leading to a downwardly-directed end opening.

The blocking element is preferably a single valve body movable along a valve body housing which provides a sealing seat for the body at the upstream end, an enclosed tubular conduit for the draw path in which the valve body is a relatively close fit (having regard however to the viscosity and other properties of the product so as to avoid sticking), preferably parallel-sided, and one or more flow openings providing for relatively free product flow around the valve body at the downstream end. The downstream end may also provide a retaining stop to limit movement of the valve body. Biasing means such as a spring may also be provided to act on the valve body, e.g. a compression spring disposed between the valve body and a downstream reaction abutment of the valve arrangement.

For products which are viscous and/or contain particulates the valve body preferably makes a sharp edge engagement with the sealing seat.

The valve body may be a simple rigid ball or other form of sliding solid plug. It may have a flexible peripheral sealing lip on a central body if closer sealing in the draw path is required; e.g. for lower viscosity liquids. One special novel form of sealing lip is a radial elastomeric flange e.g. provided by trapping an elastomer disc onto the end of a rigid valve body of smaller diameter. This may seal fluid while allowing particulates to pass.

The valve body may make an axial guide sliding engagement with adjacent fixed structure of the valve arrangement to maintain its axial orientation in the draw path.

The withdrawn residue volume depends on the cross-section and length of the draw path, and is determined with reference to the practical requirements e.g. the shape-and size of the nozzle. Preferably the length of travel of the blocking element while blocking the draw path is at least half and more preferably at least the same as the maximum transverse cross-sectional dimension of the blocking element.

A simple valve body is not the only possibility. For example the blocking element may be itself a sub-assembly comprising a valve body retained in a sleeve, the body being movable along the sleeve between a sealing seat and one or more flow openings for the above-described behaviours, and the sleeve itself being mobile along the discharge passage between upstream and downstream positions, blocking the passage whenever the valve body is against its sealing seat.

The suck-back mechanism proposed above moves product back into the pump chamber. This volume may be accommodated in various ways according to the nature of the pump. Where there is a plunger return spring, the suck-back volume joins the volume priming the pump chamber. If there is compliance or delay in the inlet valve and no back-pressure behind the inlet valve, material drawn back can escape that way. Or, it may be accommodated by a slight movement of the plunger.

However, for the particular case in which the above modes of accommodation are not available, unreliable or not desired we propose that the pump chamber may be provided with a yielding wall element to accommodate the drawn-back volume without requiring back-flow at the inlet or bodily movement of the plunger. It is also preferred that this accommodation is free, i.e. not against a resilience which would tend to urge the extra volume gradually out again past the outlet valve. To this end, the yielding wall element is preferably provided in accordance with the second set of proposals which follow.

In our second set of proposals, a dispenser pump of the kind described has a plunger which is a piston plunger making a sliding primary seal against a cylinder wall comprised in a body of the pump, and reciprocable in this pump body cylinder to alter the pump chamber volume. The piston plunger has a head, and a shaft which has an outer annular shaft element (e.g. a ring, sleeve or tube piston) to which the sliding primary seal is made and an end face directed inwardly onto the pump chamber. The end face has a central portion which by pressing on the plunger head is axially advanceable relative to the shaft's outer annular shaft portion, against a restoring force, to a displacement position. On releasing the pressure on the plunger head it retracts axially relative to the outer annular portion, under the influence of the restoring force, to an accommodation position. The shaft comprises a flexible membrane wall providing a seal between the outer and central portions that flexes to accommodate the relative axial movement between them. Preferably the membrane wall is itself elastic or elastomeric to provide all or some of the restoring force as it flexes to the displacement position. Preferably a mechanical spring, conveniently a helical spring, is provided acting between the two shaft components to urge them back towards the accommodation position. The membrane wall may be at the shaft's end face and be continuous across the central portion thereof, so that the only fluid-tight join needed is that to the outer annular shaft portion. Action on the central end portion from the plunger head is preferably mechanical action via a stem component of the shaft extending—preferably continuously but optionally with lost motion or other discontinuity—from the head to the inner end centre of the shaft. Action via compression of an enclosed air space would also be possible. Where the membrane wall is continuous across the inner end, the end of a mentioned stem component can act on the rear face of the membrane wall.

The outer shaft portion may be a rigid ring piston mounting an outwardly-directed resilient sealing element to contact the cylinder wall and also having a joint arrangement for connecting the periphery of the flexible membrane wall.

Preferably rigid mechanical limit stop engagements are provided acting between the axially relatively-movable components of the shaft to protect the membrane wall against excessive deformations. A central stem component as mentioned preferably makes a guiding or centering engagement with the outer annular portion.

When the user presses the plunger down the central end portion advances to its displacement position, i.e. the end of the plunger occupies a relatively larger volume within the pump cylinder. When pressure on the plunger is released at the end of the dispensing stroke—which need not be a complete stroke—the plunger's central end portion retracts under the restoring force so that for a given position of the primary seal the volume displaced by the piston is then reduced. This reduction in displacement by the piston at the end of a dispensing stroke can be exploited to accommodate material sucked back into the pump chamber in accordance with the first proposals above. However the second proposals have independent significance beyond the first proposals. For example the reduction in piston displacement at the end of the dispensing stroke can be used to drive a suck-back phenomenon, by creating negative pressure in the pump chamber, in cases where the outlet valve is adapted for suck-back in some way other than in the first proposal e.g. by manufactured imperfection or by delayed closure.

Furthermore the ability to modify the piston displacement without sliding the primary seal may provide a desirable auxiliary dispensing function whereby small movements of the dispenser head can be used to dispense small volumes corresponding to the change in plunger displacement without sliding the primary seal. This can provide "spot doses" in a reproducible way which would be hard to do consistently by bodily movement of the plunger.

This spot-dosing function may be exploited in a dispenser pump of the kind described without any suck-back arrangement, if wished.

A third set of proposals herein relates to dispenser pumps of the kind described having a projecting discharge nozzle whose nozzle tip has a downwardly-directly directed end opening, and in which pump a suck-back arrangement (preferably but not essentially in accordance with the first set of proposals above) is provided for drawing product residues upstream towards the pump chamber along a main discharge passage of the nozzle. In our proposals the nozzle tip has at least one longitudinal internal dividing wall which divides the discharge passage into passage portions extending side by side. At least one of these passage portions is open while at least one other is obstructed at or adjacent the end opening by a displaceable closure flap, e.g. a resiliently deformable flap valve.

Preferably a said internal dividing wall is a central conduit which defines a central, open passage portion surrounded by an annular passage region closable by an annular displaceable closure flap.

The purpose of this subdivision is to improve the effectiveness of suck-back, particularly in nozzles made with relatively large cross-section to reduce the effort of dispensing. During dispensing the closure flap is displaced outwardly by the flow of liquid product, so that a large nozzle area is exploited. When flow ceases the flap then returns—preferably resiliently—to block the respective passage portion so that the ensuing reverse flow caused by the suck-back is concentrated in the open passage portion. The suck-back then acts more effectively to clear the proportionately smaller passage, while the closure flap and dividing wall inhibit dripping of liquid from the other passage portion(s).

Preferably the discharge nozzle inclines upwardly from the outlet except adjacent the nozzle tip where the mentioned subdivision is provided. Provided that the suck-back can clear the open passage portion(s) back into the inclined nozzle portion, dripping can effectively be prevented. The inclined arrangement also avoids excessive accumulation of liquid behind the closure flap.

A fourth set of proposals herein relates to dispenser pumps of the kind described in which the plunger is a piston axially reciprocable in a cylinder formed by the body of the pump, between innermost and extended limit positions corresponding to a full dose, and has a shaft passing through top guide portion of the pump body. The pump body's guide portion has a click formation engageable with a click formation on an intermediate portion of the piston shaft to give a sensible e.g. audible and/or tangible user signal corresponding to a predetermined part-dose plunger position as the shaft's intermediate portion moves through the guide portion.

This user signal may be exploited when raising the plunger in a hand-primed pump, so as to fill the chamber only partially but to a predetermined extent. Or, the fully-primed chamber may be only partially emptied to a predetermined extent by depressing the plunger until the is signal is noted.

The piston shaft may have more than one click formation at spaced positions corresponding to part-doses of different sizes.

Preferably the piston shaft, which is usually cylindrical, has an axially-extending circumferentially-localised channel in which a shaft click projection is recessed so as not to project beyond the surface envelope of the shaft. Correspondingly a click projection on the body's guide portion projects into the channel on the shaft to interfere with the click projection therein as it passes. Preferably the or each shaft click projection is a rigid lug while the guide portion's click projection may be another rigid lug or more preferably a flexible tongue. An alternative click formation would be an axially-localised recess on one of the components, preferably the shaft, to engage a projection on the other.

A click projection for the guide portion may conveniently be provided on a discrete annular fitting securable to the guide portion, for ease of manufacture.

The plunger stem may carry distinctive visual symbols representative of dose sizes which appear immediately above the body at click positions.

As will be appreciated from the discussion herein and the ensuing description of embodiments, the above independent proposals can be freely combined.

We particularly envisage their implementation in pumps with relatively large dose sizes, say from 50 ml upwards. Preferably the plunger is arranged for generally upright operation. The pump may be manually-primed, i.e. without a return spring, to reduce the dispensing force required since various of the above proposals are useful to this end. Means for connecting the pump to a supply container may position the container beside or above the pump so that there is a positive fluid pressure at the pump inlet. The nature of the pump inlet is not particularly limited. A flap valve is preferred for the inlet valve because of its low operating force, but other kinds of valve may be used.

A fifth independent proposal herein—again, freely combinable with all of the other proposals herein—relates to the construction of a connecting conduit bridging between a fluid supply outlet and a pump inlet in a dispensing system, where the outlet and inlet both extend transversely to the bridging direction e.g. with pump and supply side-by-side, their respective inlet and outlet directed downwardly. A conventional U-tube has multiple components and is hard to dismantle. Our proposal is to form the conduit from two shell portions which face one another in the mentioned transverse direction and are joined around a single loop of boundary joint, preferably substantially in one plane. A first one of the shell portions has first and second tubular formations, spaced in the bridging direction, for the fluid supply outlet and pump inlet respectively. At least one of the shell portions, preferably at least and most preferably only the first one, has an open bridging recess extending in the bridging direction which, when the shell portions are joined together around the boundary, provides an enclosed bridging conduit section connecting the fluid supply tube to the pump inlet tube.

This proposal advantageously enables easy manufacture of the parts, since both tubular formations can extend in a mould-separation direction for moulding the first shell portion. The second shell portion is preferably a substantially flat plate. If wished, the pump inlet union tube may be formed in one piece with a pump cylinder wall of the pump.

BRIEF DESCRIPTION OF THE DRAWINGS

Embodiments of our proposals are now described with reference to the accompanying drawings, in which:

FIG. 2 is a side view of a modified outlet valve arrangement suitable for the FIG. 1 pump;

FIG. 3 is an axial cross-section of the FIG. 2 valve arrangement;

FIG. 4 is an axial cross-section of the pump's plunger piston;

FIG. 5 is an enlarged detail at the piston end;

FIG. 6 is an axial cross-section of the plunger stem, with FIG. 6(a) showing a clicker detail enlarged;

FIG. 7 is a front view of the same plunger stem;

FIG. 8 is a bottom view of the discharge nozzle tip of the pump as shown in FIG. 1, and FIG. 9 is a cross-section of the nozzle tip at IX—IX;

FIGS. 11(a) and 11(b) show enlarged detail of the outlet valve construction and operation;

FIGS. 12(a), 12(b) and 12(c) are fragmentary axial cross-sections showing stages of suck-back;

FIG. 13 is a bottom view of an upper conduit shell from the second embodiment.

DETAILED DESCRIPTION OF PREFERRED EMBODIMENTS

Figure 1:
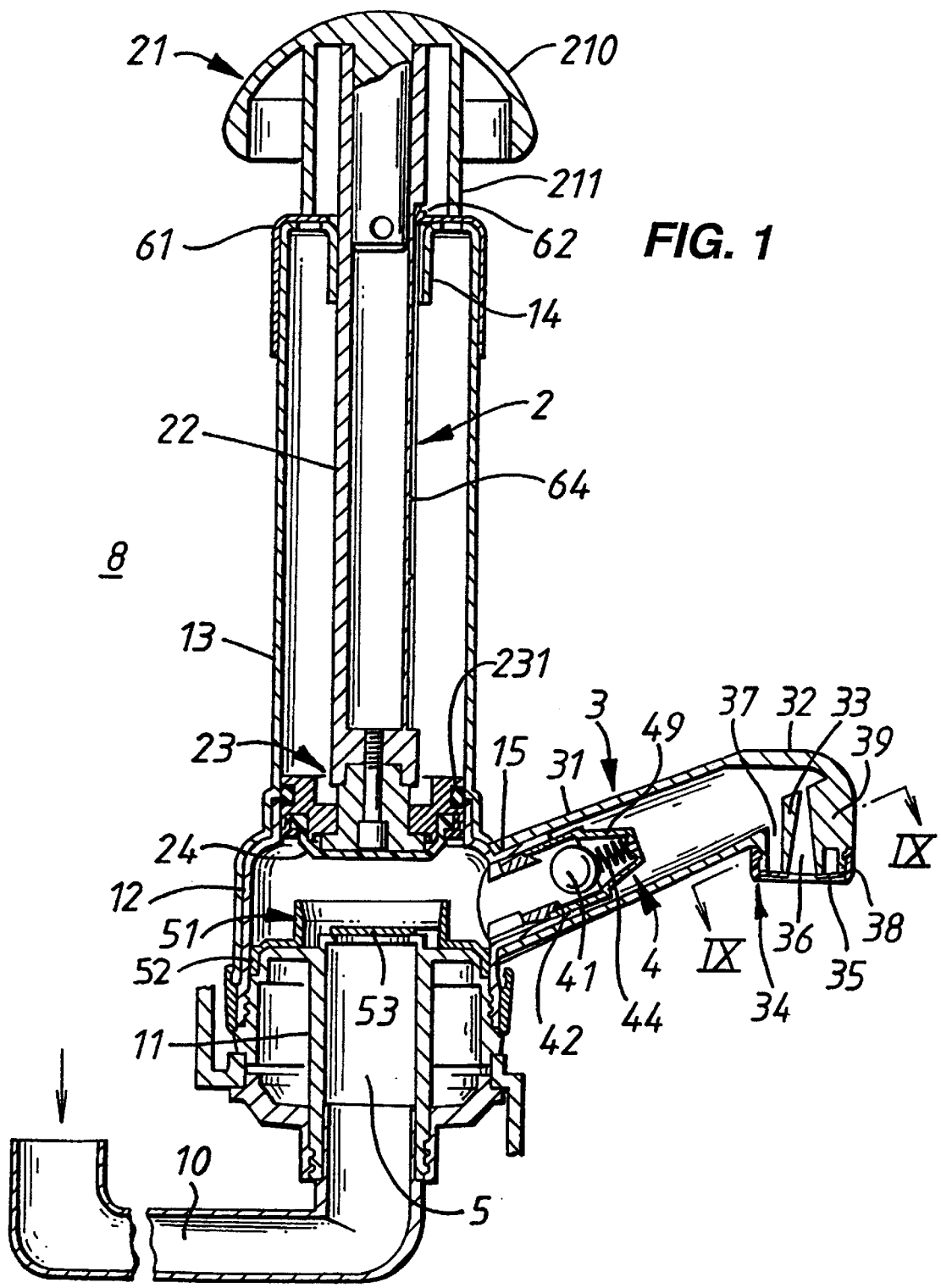
FIG. 1 is an axial cross-section of a first embodiment of dispenser pump.

The illustrated examples of pumps embodying the proposals described previously are fixed-nozzle piston-and-cylinder pumps made primarily of plastics materials for domestic use, e.g. for dispensing viscous liquids such as laundry products by manual operation.

In the first embodiment (FIG. 1) liquid product from a supply container 8 is fed via an inlet conduit 10 (neither shown in detail here) to the pump inlet 5 which opens upwardly through a core or base 11 of the pump body 1. The pump body includes a lower chamber 12 and an upward cylinder extension 13 secured over the core 11 by appropriate screw and snap engagements. The joint between the lower body chamber 12 and the core 11 traps the base flange of an inlet valve unit 51 including a flexible valve flap 53 overlying the inlet opening. The operation of the inlet valve is generally conventional. Because the product supply 8 is mounted above the inlet 5 there is a prevailing tendency for product to flow through the inlet 5 into the pump chamber.

The cylinder extension 13 has a cylindrical inner surface cooperating with the piston 23 of the pump plunger 2, shown here in its lowermost position. The piston 23 has a generally conventional rubber seal ring 231 making a primary seal against the cylinder wall. It will be described in more detail below. The pump has no return spring, so that the plunger position in FIG. 1 is the rest condition. This reduces the effort needed to operate the pump, since the preferred dose is around 90 or 100 ml and a long and strong spring would be needed to prime-the pump with this volume of a viscous liquid.

The plunger 2 has a stem 22 extending up from the piston 23 through a guide sleeve 14 at the top of the cylinder where it is fixed to a head unit 21 providing a rounded top cap 210 and a downwardly-extending stop abutment 211 which meets the top of the pump body cylinder 13 to prevent depression of the plunger 2 past the position shown.

A discharge nozzle 3 is fitted onto a side spigot 15 of the pump body's lower chamber 12. The main span 31 of the nozzle 3 extends out at an upward inclination to a tip module 32 with a downwardly directed opening.

An outlet valve arrangement 4 is installed in the root of the nozzle 3, and in this embodiment consists of a tubular valve housing 49 force-fitted into the pump body spigot 15. The valve casing 49 contains a ball 41 biased by a valve spring 44 towards a valve seat 42.

Further details of the outlet valve arrangement are now described with reference to a preferred variant shown enlarged in FIGS. 2 and 3. The casing 49 is a generally tubular plastics unit to be fixed inside with the nozzle, having a cage portion 46 at the downstream end consisting substantially of window openings 47, a seat insert with a sharp-edged valve seat 42 fitted into the upstream end of the casing to trap the ball 41 and its biasing compression spring 44 inside, and a cylindrical tubular draw path conduit 43 with a closed wall extending downstream from the valve seat. The length of the draw path conduit 43 is slightly greater than the diameter of the ball 41, for example about 10 mm. The fluid to be dispensed is a viscous one which may contain small particulates, so the sealing seat 42 is sharp-edged to avoid compromise of the seal by trapped particulates and some clearance is provided between the ball 41 and the tubular wall of the conduit 43 to prevent sticking. The difference in diameters is about 1.5 mm in this embodiment. These parameters can be tuned by the use of thin sleeve inserts 48 in the conduit 43 to adjust its diameter.

FIG. 2 shows the outlet valve in its open position, where the ball 41 has been carried downstream by the product flow to beyond the end of the draw path conduit 43 and into the open cage 46 where product flows freely around it through the windows 47 and out along the nozzle 3. When the flow of product ceases the spring 44 urges the ball back upstream (to the left, in the figure) and into the draw path conduit 43. From when it enters this conduit (the position shown in broken lines in FIG. 3) until it meets the sealing seat 42 the moving ball 41 fits closely in the enclosure so as to draw a corresponding volume of product residue upstream along the nozzle 3 and push that volume back into the pump chamber.

For free flow of a large dose the nozzle 3 is made wide and open, and contains more than can easily be withdrawn by the suck-back action of the outlet valve 4. Because of the upward inclination of the main run 31 of the nozzle, however, clearance of only the nozzle tip region is sufficient to prevent dripping. Nevertheless the wide cross-section at the nozzle tip in large dispensers makes this a demanding task for the suck-back arrangement and a special nozzle tip construction is adopted accordingly. Refer to FIGS. 1, 8 and 9.

The nozzle tip has a separate moulded module 32 fitted onto the end of the main inclined run 31 of the nozzle. The nozzle tip module 32 has an integral internal partition tube 33 joined to the outer wall by a connecting fin 39 to divide the downwardly-directed tip portion of the passage into an inner tubular conduit 36 with upward convergence and an outer annular conduit 37. A rubber valve cap 34, fixed over the opening of the nozzle tip by means of a securing rim 38, has a thin rubber closure flap 35 extending in to close off the annular conduit 37 while leaving the central conduit 36 open. During dispensing the pressurised fluid flow easily forces the thin rubber flap 35 aside to exploit the main annular area of the nozzle opening for dispensing. When flow ceases the rubber flap is restored to its-rest condition, closing off the large annular conduit 37 at the bottom. The suck-back created by the outlet valve operation described above therefore acts only on the central conduit 36 and is effective to clear it because it is a relatively small-section conduit. Since drips would be most likely to form at the centre of the outlet, a likely source of drips is therefore eliminated without needing to clear the entire nozzle tip. Product is not sucked back from the annular region 37 but dripping here is prevented by the rubber flap 35 which can act effectively across this relatively short span.

The suck-back operation of the outlet valve 4 drives a small volume of product back into the pump chamber as the dispensing stroke finishes, at the same time as product is seeking to enter the pump chamber through the inlet valve. To accommodate the volume sucked back, the plunger piston 23 has a special construction shown in more detail in FIGS. 4 and 5.

The piston 23 comprises a rigid outer annulus with a groove for the sealing ring 231 and a central plate 232 with a circular hole slidably receiving a terminal unit 26 of the plunger stem 22. The stem terminal unit 26 has a smaller diameter than the main stem 22 and end flange, so that the piston unit 23 is slidably axially movable between upper and lower stop surfaces 27 on these components.

A generally circular rubber end diaphragm 24 is clamped by its peripheral bead 241 into a mounting groove around the rigid piston unit 23 and held in place there by a clamping ring 25. The diaphragm 24 covers the bottom end of the stem terminal 26, pressing resiliently up against it as seen in FIG. 5. FIG. 4 shows the rest configuration which the diaphragm 24 would adopt if the stem terminal were not there. The piston unit 23 is therefore biased against the lower stop surface 27 in the absence of other forces.

In the priming stroke before dispensing the plunger is lifted and the piston 23 remains in the position shown in relation to the stem as it slides up the cylinder 13. When the plunger is pushed down in the dispensing stroke, however, friction at the seal 231 holds the piston 23 during the initial downward movement of the plunger stem 22 until the top limit surface 27 meets the piston plate 232 from above and forces it down with the stem. In this condition the central web of the diaphragm 24 is pushed out to a bulging, volume-displacing condition by the foot of the stem terminal 26. It remains in this condition until the end of the dispensing stroke when the plunger is released and a combination of the diaphragm resilience, the back-flow from the nozzle 3 and inflow through the inlet 5 urge the plunger stem 22 to retract to the upper position as seen in the figures, providing an opportunity for the volume of material sucked back from the nozzle to be accommodated without tending to be pushed out again.

It should be noted that this stem retraction and volume accommodation will occur at whatever stage of the stroke the plunger 2 is released.

A further benefit of the arrangement is that, at any position of the plunger, a small volume of material can be dispensed from the nozzle by small pushes on the plunger which advance the diaphragm 24 to displace 1 or 2 ml from the pump without moving the main seal 231 against the cylinder wall Users may not always wish to dispense the full dose corresponding to a complete stroke of the plunger. The dispenser pump includes means for signalling when the plunger passes a predetermined intermediate position so that the user can reliably dispense a partial dose of predetermined size.

As seen in FIGS. 1, 4, 6 and 7 the generally cylindrical plunger stem 22 has an elongate axially-extending channel 63 extending down one side. The base of this channel has one or more small projecting lugs or pips 64 corresponding to predetermined plunger positions for dispensing a partial dose. Being recessed in the channel 63 these lugs 64 do not interfere with the movement of the stem through the cylinder guide-sleeve 14.

A clicker cap 61 is fitted over the top of the cylinder 13 as seen in FIG. 1 and has a round central opening with at one side an inward resilient tongue 62 which projects into the plunger stem channel 63. As one of the lugs in the channel is drawn through the guide sleeve 14 it catches and raises the tongue 62 which then falls back with an audible click against the cylinder top, signalling to the user that the predetermined plunger height has been reached.

Figure 10:
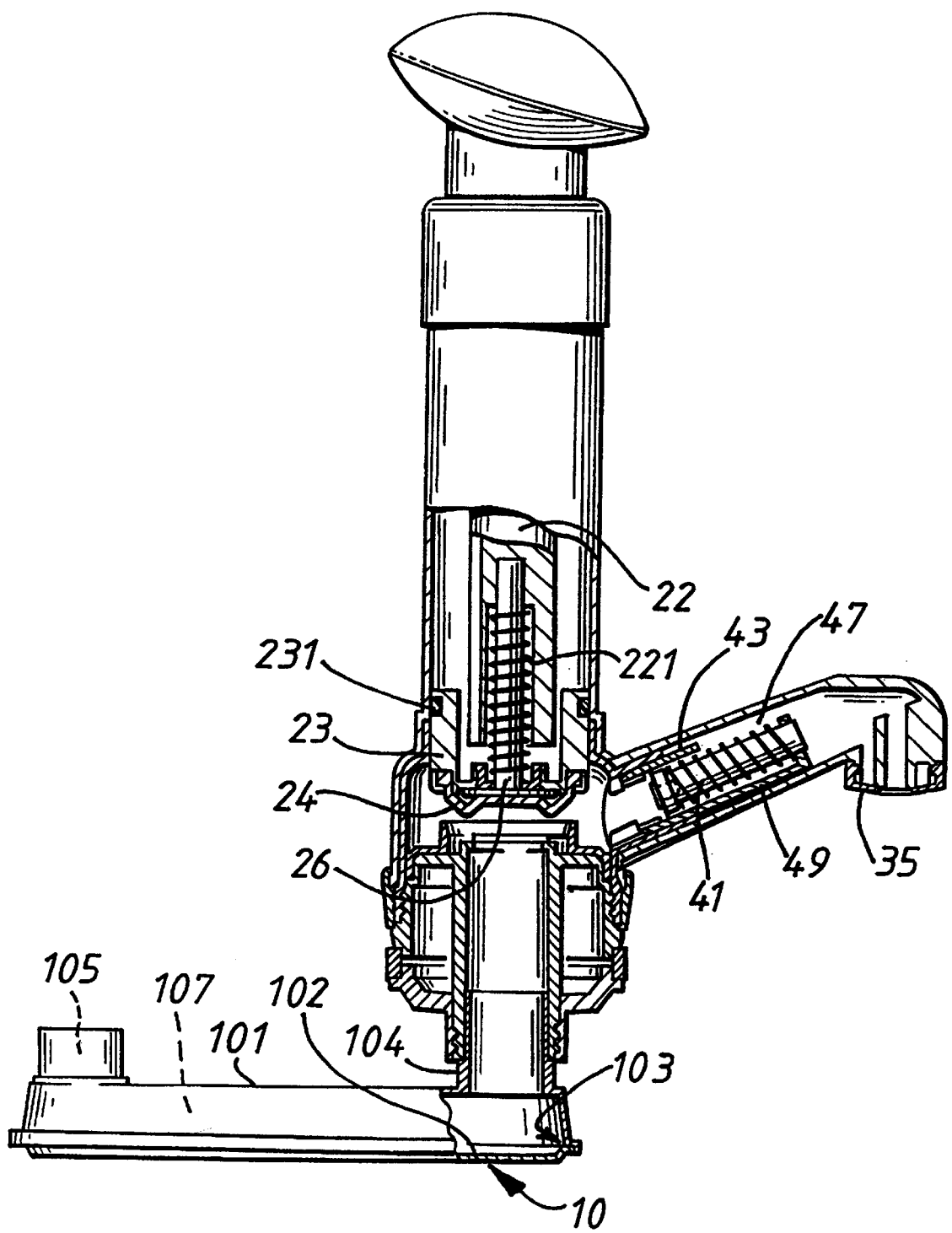
FIG. 10 is an axial cross-section of a second embodiment of dispenser pump.

FIG. 10 shows a second embodiment differing with the respect to the deformable piston face, the suck-back arrangement at the outlet valve and the connection conduit 10. FIG. 11 shows the insert casing 49 of the valve arrangement in detail. The tubular cylindrical casing 49 is substantially as before. The valve body 41 is in the form of a rod, eg of plastics material, fitting in the casing tube with some clearance and having a peripheral rubber sealing lip 411 around its front end to provide a close fit. The rod body has a larger-diameter front boss 412 to support a still larger circular rubber disc providing the sealing lip 411, and a long, straight rear part 413 which runs through a hole in the downstream end of the casing 49 to act as a guide. The biasing spring 44 fits around this rear part 413 and acts between the downstream end of the casing and the front boss 412 of the valve body 41. A stud 414 holds the rubber disc in place.

Embodiments of the invention have been tried for dispensing viscous liquids containing particulates. In the first embodiment (FIG. 1) appreciable clearance was needed between the ball 41 and its casing to avoid sticking caused by the particulates. Good suck-back was nevertheless achieved because of the high viscosity of the liquid. The present embodiment is designed to deal with lower-viscosity liquids, which may nevertheless contain particulates. We have found that a radial rubber lip can provide a good seal for the fluid without sticking on the particulates.

FIGS. 12(a), (b), (c) show different states of the outlet valve. In FIG. 12 (a) the product is being dispensed by pushing on the plunger. The flow of product pushes the valve shuttle body 41 back against its spring and escapes to discharge via the windows in the valve casing 49. When the piston is released the outflow of liquid stops and the spring 44 pushes the shuttle body 41 back. Part way back its front seal 411 engages fittingly in the closed cylindrical draw path 43 of the valve casing and suck-back of the product from the nozzle tip proceeds. The nozzle flap valve 35 closes off the annular discharge passage portion when the piston is released, so the suck-back from the shuttle valve 41 easily clears the central passage portion 36 of the nozzle tip. The draw path 43 is dimensioned so that when the shuttle valve body 41 reaches the end of its stroke as seen in FIG. 12(c) the liquid level in the nozzle will have fallen below the top of the tubular dividing wall 33 in the nozzle, preventing subsequent dripping.

A further difference in the FIG. 10 embodiment is that a spring 221 is provided to act axially between the plunger shaft 22 and the plunger end part 26 which pushes out the membrane 24. This supplements the restoring force of the membrane 24 making it possible to use a more flaccid membrane. It is easier to adjust the strength of a mechanical spring of this kind than to select a membrane shape and resilience which gives sufficient restoring force without tending to move the main seal 231 when spot-dosing.

Another feature of the second embodiment is the special construction of the conduit 10. This is made from upper and lower moulded plastic shells 101, 102. The upper shell 101—seen from beneath in FIG. 13—has an inverted bathtub form, the perpendicular tubular unions 104,105 for the pump inlet and fluid supply being easily formed integrally with the bathtub form by moulding. The longitudinal recess 107 of the bathtub form is likewise easily formed, and puts the unions 104, 105 in communication when the conduit 10 is closed by the lower shell 102. This is essentially a flat rectangular plate having a bonding border opposed to a corresponding bonding border on the upper shell 101 to form a continuous butted joint 103 between the two shells. This may be e.g. glued, ultrasonically bonded or hot-plate welded. Screw lugs 106 may be provided for securing the conduit 10 in relation to other elements of the dispensing system e.g. a box or housing (not shown).

Figure 14:
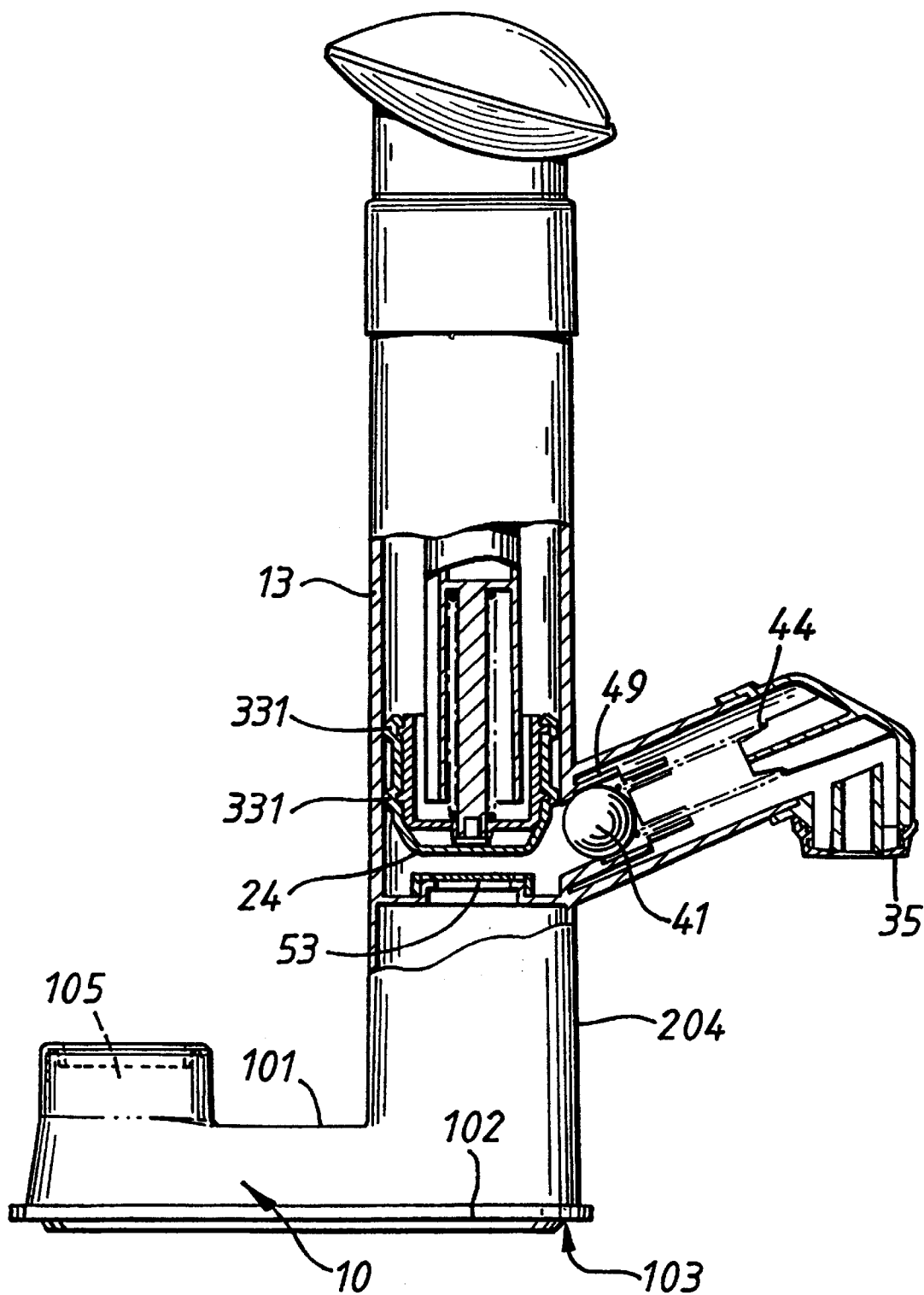
FIG. 14 is an axial cross-section at a third embodiment of dispenser pump.

FIG. 14 is a corresponding cross-sectional view of a third embodiment, here showing the top shell 101 of the bridging conduit 10 formed as a one-piece entity with the inlet construction and body wall of the pump.

A further feature in this embodiment is that the membrane 24 on the front of the plunger piston extends up around the sides of the piston's outer end unit with an annular projection to provide the primary piston seal 331 integrally.

With reference to the discharge nozzle construction, here the casing 49 for the suck-back ball valve 41 has been formed integrally with the pump body shell and discharge nozzle wall, as an inner concentric cylindrical wall spaced from the outer wall of the discharge nozzle. The nozzle is a short one, so the reaction abutment for the biasing spring 44 is provided at the opposing end of the upwardly-inclined discharge passage, directly above the downward opening of the nozzle.

What is claimed is:

1. A dispenser pump for fluid material having a pump chamber alterable in volume by the action of a reciprocable plunger, a pump chamber inlet having an inlet valve, a pump chamber outlet having an outlet valve arrangement and a discharge nozzle defining a discharge passage extending downstream of the outlet valve arrangement;

the outlet valve arrangement having a blocking element which is movable along the discharge passage between a closed valve condition at an upstream position and an open valve condition at a downstream position, the outlet valve arrangement defining a restricted draw path extending along the discharge passage between said upstream and downstream positions and dimensioned to be substantially blocked by the blocking element, the outlet valve arrangement further comprising a spring member, the blocking element being biased by said spring member towards the upstream position, whereby upon displacement of the plunger to reduce the volume of the pump chamber the blocking element is drivable along the draw path against the bias of said spring member to the downstream position for dispensing said fluid material in the valve open condition, and upon discontinuing displacement of the plunger the blocking element is driven back along the draw path under the bias of said spring member to drive material back into the pump chamber and draw residual material back along the discharge passage.

2. A dispenser pump according to claim 1 in which the outlet valve arrangement comprises a valve body housing having at its upstream end a sealing seat for a valve body which constitutes said blocking element, an enclosed tubular conduit extending downstream of the sealing seat to provide the draw path, and at its downstream end one or more flow openings communicating along the discharge passage.

3. A dispenser pump according to claim 1 in which the blocking element is a ball.

4. A dispenser pump according to claim 1 in which the blocking element comprises a rigid central body and a flexible peripheral sealing lip.

5. A dispenser pump according to claim 1 in which the discharge nozzle leads along an upward incline to a downwardly directed tip opening.

6. A dispenser pump for fluid material, having a pump chamber alterable in volume by the action of a reciprocable plunger, a pump chamber inlet having an inlet valve, a pump chamber outlet having an outlet valve arrangement and a discharge nozzle defining a discharge passage extending downstream of the outlet valve arrangement;

the outlet valve arrangement having a blocking element which is movable along the discharge passage between a closed valve condition at an upstream position and an open valve condition at a downstream position, the outlet valve arrangement defining a restricted draw path extending along the discharge passage between said upstream and downstream positions and dimensioned to be substantially blocked by the blocking element, the blocking element being biased towards the upstream position for its return thereto along the draw path after dispensing to draw residual material back along the discharge passage;

the discharge nozzle leading along an upward incline to a downwardly directed tip opening, and in which the nozzle tip has at least one longitudinal internal dividing wall dividing the discharge passage into side-by-side passage portions, at least one said passage portion being open and at least one other said passage portion being obstructed by a displaceable closure flap.

7. A dispenser pump according to claim 6 in which the dividing wall is a tubular conduit defining a central open passage portion surrounded by an annular passage portion closable by a resiliently displaceable annular closure flap.

8. A dispenser pump for fluid material having a pump chamber alterable in volume by the action of a reciprocable plunger, a pump chamber inlet having an inlet valve, a pump chamber outlet having an outlet valve arrangement and a discharge nozzle defining a discharge passage extending downstream of the outlet valve arrangement;

the outlet valve arrangement having a blocking element which is movable along the discharge passage between a closed valve condition at an upstream position and an open valve condition at a downstream position, the outlet valve arrangement defining a restricted draw path extending along the discharge passage between said upstream and downstream positions and dimensioned to be substantially blocked by the blocking element, the blocking element being biased towards the upstream position for its return thereto along the draw path after dispensing to draw residual material back along the discharge passage;

in which said reciprocable plunger has an outer annular shaft portion with a primary piston seal slidable against a cylinder wall of the pump body, an end face having a central portion which by pressing on the plunger head is axially advanceable relative to the outer annular portion of the plunger against a restoring force, the shaft having a flexible membrane wall providing a deformable seal which accommodates the relative movement between the outer and central portions of the shaft.

9. A dispenser pump for fluid material having a pump chamber alterable in volume by the action of a reciprocable plunger, a pump chamber inlet having an inlet valve, a pump chamber outlet having an outlet valve arrangement and a discharge nozzle defining a discharge passage extending downstream of the outlet valve arrangement;

the outlet valve arrangement having a blocking element which is movable along the discharge passage between a closed valve condition at an upstream position and an open valve condition at a downstream position, the outlet valve arrangement defining a restricted draw path extending along the discharge passage between said upstream and downstream positions and dimensioned to be substantially blocked by the blocking element, the blocking element being biased towards the upstream position for its return thereto along the draw path after dispensing to draw residual material back along the discharge passage;

and in which the plunger's rest condition is a lowermost position corresponding to a low-volume condition of the pump chamber.

10. A dispenser pump for fluid material having a pump chamber alterable in volume by the action of a reciprocable plunger, a pump chamber inlet having an inlet valve, a pump chamber outlet having an outlet valve arrangement and a discharge nozzle defining a discharge passage extending downstream of the outlet valve arrangement;

the outlet valve arrangement having a blocking element which is movable along the discharge passage between a closed valve condition at an upstream position and an open valve condition at a downstream position, the outlet valve arrangement defining a restricted draw path extending along the discharge passage between said upstream and downstream positions and dimensioned to be substantially blocked by the blocking element, the blocking element being biased towards the upstream position for its return thereto along the draw path after dispensing to draw residual material back along the discharge passage;

in which the plunger has a shaft passing through a top guide portion of the pump body, and the guide portion has a click formation engageable with a corresponding click formation at an intermediate position on the shaft to give a sensible user signal as the intermediate position of the shaft passes the guide portion of the pump body.

11. A dispenser pump for fluid material having a pump chamber alterable in volume by the action of a reciprocable plunger, a pump chamber inlet having an inlet valve, a pump chamber outlet having an outlet valve arrangement and a discharge nozzle defining a discharge passage extending downstream of the outlet valve arrangement;

the outlet valve arrangement having a blocking element which is movable along the discharge passage between a closed valve condition at an upstream position and an open valve condition at a downstream position, the outlet valve arrangement defining a restricted draw path extending along the discharge passage between said upstream and downstream positions and dimensioned to be substantially blocked by the blocking element, the blocking element being biased towards the upstream position for its return thereto along the draw path after dispensing to draw residual material back along the discharge passage;

in which the pump inlet is directed downwardly and communicates with a connecting conduit to bridge between the pump inlet and a fluid supply outlet also directed downwardly, such connecting conduit being formed from upper and lower shell portions which are joined sealingly together facing one another around a single boundary joint, the upper shell portion having first and second upwardly-directed tubular formations for the pump inlet and supply outlet respectively.

\* \* \* \* \*